United States Patent Office 2,984,652
Patented May 16, 1961

2,984,652
COPOLYMERS OF VINYL ALCOHOL AND VINYL ESTERS OF LONG-CHAIN FATTY ACIDS AND PROCESSES FOR PREPARATION THEREOF

Edmund F. Jordan, Jr., Philadelphia, William S. Port, Norristown, and Daniel Swern, Philadelphia, Pa., assignors to the United States of America as represented by the Secretary of Agriculture No Drawing. Filed July 5, 1957, Ser. No. 670,351

7 Claims. (Cl. 260—85.7)

(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This application is submitted as a continuation in-part to our copending application entitled "Copolymers of Vinyl Formate and of Vinyl Alcohol With Vinyl Esters of Long-Chain Fatty Acids," Serial Number 422,707, filed April 12, 1954.

This invention relates to novel copolymers of vinyl alcohol and vinyl esters of saturated fatty acids having 12 through 18 carbon atoms in their molecules, hereinafter referred to as long-chain fatty acids and to the production of these copolymers. More particularly, this invention relates to copolymers of vinyl alcohol and vinyl stearate and to processes whereby vinyl alcohol-vinyl stearate copolymers are produced.

According to this invention a copolymer of vinyl alcohol and a vinyl ester, as, for example vinyl stearate, is produced by removing essentially all the formate groups from a vinyl formate-vinyl ester of a long-chain saturated fatty acid copolymer without affecting significantly the esters groups of the long-chain fatty acid, the process applied to the vinyl formate-vinyl ester copolymer being selected from the group consisting of hydrolysis, as that obtained in dilute (in the normality range of 0.01 to 0.25 N) aqueous acid suspension at a range of temperatures of 60° to 100° C. in a time interval of about 3 to 24 hours, or in about 1 to 5 hours in an aqueous emulsion at about 70° to 100° C., or by alcoholysis, as obtained by refluxing in the presence of an alcohol, as methanol, and an acid catalyst for about 5 hours.

Vinyl alcohol copolymers of this invention containing as little as 8% by weight of a vinyl ester of a long-chain saturated fatty acid such as stearic acid have markedly improved water resistance. Yet, those containing less than about 30% by weight of the vinyl ester retain most of the valuable properties of polyvinyl alcohol, that is, high tensile strength, resistance to organic solvents, high softening point, flexibility, etc. When the copolymers contain more than about 30% by weight of the vinyl ester of the long-chain fatty acid they show increasingly the properties of the homopolymer of the polyvinyl ester, though they also retain some of the properties of polyvinyl alcohol, particularly the organic solvent resistance, when the ester content is as high as 90%.

It is well known that polyvinyl alcohol has a high softening point and is therefore difficult to mill, mold, extrude or otherwise compound and fabricate. On the other hand, polyvinyl esters, such as the acetate, soften or melt at relatively low temperatures. The vinyl formate copolymers of this invention resemble the other polyvinyl esters in having a low softening point. However, after the formate esters are hydrolyzed, the resulting vinyl alcohol copolymers have much higher softening points, yet not so high as to make them difficult to fabricate. Accordingly, the copolymers of this invention have properties which are highly desirable in regards to both fabrication and utilization of articles manufactured from these plastics.

Vinyl formate may be copolymerized in any proportion with the vinyl esters of the long-chain saturated fatty acids. For use in the preparation of the vinyl alcohol copolymers, however, we prefer to use a relatively high proportion of formate, that is, at least 50% and preferably 70 to 92% by weight of vinyl formate.

The copolymerization of vinyl formate and a vinyl ester of a long-chain saturated fatty acid may be effected by any conventional method for the free radical polymerization of vinyl monomers.

Our preferred procedure for preparing these copolymers comprises heating a solution of the monomers, such as vinyl formate and vinyl stearate, in a suitable solvent to which a catalytic amount of a free radical initiator has been added. Conventional free radical initiators such as per-compounds, redox systems, heat, light, or any combinations of these, may be used. Poor yields of polyvinyl formate are obtained when polymerization or copolymerization of vinyl formate is conducted in the conventional way in aqueous emulsion or suspension, due to the rapid rate of hydrolysis of vinyl formate at the temperature required for polymerization. We have found, however, that a high yield of polyvinyl formate and copolymers of vinyl formate may be obtained in aqueous suspension or aqueous emulsion by using suitable redox systems.

In copolymerization, vinyl formate has approximately the same reactivity as other vinyl esters and, therefore, the copolymer composition is very nearly that of the monomer mixture, as illustrated by the data presented in Table I.

TABLE I

Vinyl formate-vinyl stearate copolymers

| Example No. | Percent Vinyl Stearate | | Saponification No., Polymer |
|---|---|---|---|
| | Monomer | Polymer | |
| 1 | 11.75 | 11.04 | 712.3 |
| 2 | 18.50 | 17.70 | 672.5 |
| 3 | 32.47 | 31.68 | 589.0 |
| 4 | 59.62 | 65.77 | 385.4 |

The copolymer designated as Example 1 in Table I was prepared by the following procedure:

EXAMPLE 1

A solution of 176.8 g. (2.452 moles) of vinyl formate, 23.5 g. (0.0756 mole) of vinyl stearate, 1.225 g. benzoyl peroxide (0.2 mole percent based on total moles of monomers) and 9.12 g. isopropanol was heated and agitated at 30° C. for 48 hours. The copolymer was dissolved in a liter of acetone and the resulting solution was poured into 4 liters of methanol, whereupon the copolymer precipitated. The precipitated copolymer was recovered and extracted four times with boiling methanol and then dried to constant weight. The yield of dried copolymer was 160 g. or 80%.

The other copolymers represented in Table I, Examples 2, 3 and 4, were prepared in an analogous manner using the appropriate amounts of vinyl formate, vinyl stearate, benzoyl peroxide, and isopropanol.

In the practice of this invention vinyl formate copolymers are converted to corresponding vinyl alcohol copolymers with the other vinyl ester of the copolymer, for example, vinyl stearate, remaining substantially unaffected. We have discovered several procedures by which essentially all of the formate groups may be removed and essentially all of the stearate groups are left intact.

From the analysis of Alfrey, Bohrer and Mark ("Copolymerization," Interscience Publishers, Inc., New York, 1952, p. 136) of the effect of the product of the monomer reactivity ratios on the distribution of monomer segments in copolymers, and from the demonstration by A. Adicoff, and A. Buselli, J. Polymer Sci. 21, 340 (1956) that in the copolymerization of a long-chain vinyl ester, as vinyl stearate, and a short-chain vinyl ester, as vinyl acetate, the monomer reactivity ratios are 1 and 1, it may be concluded that the distribution of the vinyl ester segments in the copolymers prepared by the procedure described in Example 1 are purely random. Accordingly, in the procedures now described in which vinyl formate segments are converted to vinyl alcohol segments there is produced a copolymer of vinyl alcohol and vinyl stearate wherein the vinyl stearate segments are substantially uniformly distributed throughout the vinyl alcohol-vinyl stearate copolymer.

In our preferred procedure the formate groups are removed by suspending the copolymer containing vinyl formate in dilute aqueous acid solution and heating. We have found that with vinyl formate-vinyl stearate copolymers containing up to about 25 mole percent (60 percent by weight) of vinyl stearate the rate of hydrolysis of the formate groups in about 0.25 normal aqueous hydrochloric acid at temperatures in the range of 60° to 90° C. is about ten times the rate of removal of the stearate groups.

Although this hydrolysis rate factor of ten is considered adequate basis for stating that the process is substantially preferential for the hydrolysis of the formate groups, we have furthermore discovered that the process can be made even more selective by using lower concentrations of acid at a temperature above 90° C. For example, when a vinyl formate-vinyl stearate copolymer containing 3 mole percent of vinyl stearate was hydrolyzed in 0.0189 normal aqueous hydrochloric acid at 96–97° C., the formate groups were removed 63 times more rapidly than the stearate groups.

The following examples illustrate this process in greater detail.

EXAMPLE 5

A mixture of 3 ml. concentrated hydrochloric acid, 150 ml. of water and 15 g. of vinyl formate-vinyl stearate copolymer containing 5 mole percent of vinyl stearate was heated on the steam bath (temperature about 96°–97° C.) for 7 hours. The acid concentration was about 0.24 normal. The mixture was poured into a liter of methyl alcohol and the copolymer filtered off and dried. The dried copolymer weighed 11 g. and analysis showed that it contained 23.7 weight percent vinyl stearate (theoretical 27.0%) and 0.8 weight percent vinyl formate.

EXAMPLE 6

The procedure of Example 5 was repeated using 15 g. of a copolymer of vinyl formate containing 10 mole percent vinyl stearate. The product was 11.6 g. of vinyl alcohol copolymer containing 41.5% by weight vinyl stearate (theoretical 43.9%) and 0.6% by weight vinyl formate.

EXAMPLE 7

Starting with a copolymer containing 3 mole percent vinyl stearate the procedure of Example 5 was repeated with the exception that the hydrolysis was conducted at 60° C. for 24 hours. The yield of vinyl alcohol copolymer was 9.6 g. and analysis showed that it contained 17.0 weight percent vinyl stearate (theoretical 17.9%) and 1.9 weight percent vinyl formate.

EXAMPLE 8

This example was patterned after Example 7 with a modification in the conditions of hydrolysis to 3 hours at 100° C. The yield of vinyl alcohol copolymer was 9.9 g. and analysis showed that it contained 13.9 weight percent vinyl stearate (theoretical, 17.9%) and 1.3 weight percent vinyl formate.

The advantage of using a low acid concentration at a high temperature in obtaining improved selectivity in hydrolysis of the vinyl esters is demonstrated by the examples presented in Table II. An important criterion for determining whether hydrolysis is preferential is the ratio of the rates of hydrolysis of formate groups and stearate groups, respectively. This is presented in Table II under the column heading $K_f K_s$ and is obtained by dividing the rate of hydrolysis of the formate groups, $K_f$ (percent hydrolysis per minute of the formate present in the original vinyl formate-vinyl stearate copolymer), by $K_s$ (percent hydrolysis per minute of the stearate in the same copolymer). A high ratio of $K_f/K_s$ is desired.

TABLE II

Rate constants for the hydrolysis of a vinyl formate vinyl stearate copolymer containing 3 mole percent vinyl stearate

| Example No. | HCl Concn., moles/liter | Temp., °C. | $K_f$, percent/min. | $K_s$, percent/min. | $K_f/K_s$ | Stearate, mole percent |
|---|---|---|---|---|---|---|
| 9  | 0.0189 | 96 | 0.812 | 0.0129 | 63   | 2.95 |
| 10 | 0.0938 | 96 | 0.667 | 0.0635 | 10.7 | 2.71 |
| 11 | 0.1845 | 96 | 0.910 | 0.133  | 6.9  | 2.56 |
| 12 | 0.1787 | 85 | 1.08  | 0.104  | 9.5  | 2.71 |
| 13 | 0.0924 | 85 | 0.505 | 0.0522 | 10.0 | 2.69 |
| 14 | 0.1776 | 75 | 0.431 | 0.0566 | 7.6  | 2.60 |

The column headed, stearate, mole percent, represents vinyl stearate determined to be present in the vinyl alcohol-vinyl stearate copolymer when hydrolysis of the formate groups was complete. In Example 9, for instance, 2.95 of the original 3.0 mole percent of the vinyl stearate was present in the hydrolyzed product, showing that better than 98% of the stearate groups were still intact. Although Example 9 gave by far the best results in terms of selective removal of the formate groups, in four of the six examples of Table II the final product contained stearate groups representing about 90% or more of the stearate groups present in the copolymer prior to hydrolysis.

It is conceivable that aqueous acid solutions of even lower normality of acid could be used to accomplish the hydrolysis, perhaps under pressure conditions to raise the temperature above 100° C. and hence reduce the time required to remove the formate groups, but the examples presented serve to illustrate an efficient process for the production of copolymers of vinyl alcohol and vinyl esters of the higher saturated fatty acids.

The acid used in the process just described may be any non-oxidizing, water-soluble acid, as hydrochloric, sulfuric, phosphoric, or formic acid.

A comparison of the effect of temperature upon the ratio of rates of hydrolysis (Table II) indicates that temperature, in the range disclosed, is not a critical factor. The higher temperatures (96–97° C.) are preferred for the more dilute acid solutions, as Example 9, as the time required to complete the hydrolysis is thereby reduced.

As an alternative process, hydrolysis in the absence of any added acid is achieved if an emulsifying agent is added to insure intimate contact between water and the copolymer of vinyl formate and vinyl esters of long-chain saturated fatty acids. The reaction is probably autocatalytic, the liberated formic acid acting as a catalyst. Usually, 1 to 5 hours at 70°–100° C. is sufficient to remove substantially all of the formate groups from a vinyl formate-vinyl stearate copolymer.

The method of selective hydrolysis in aqueous emulsion is illustrated in Examples 16 through 24. Example 15, in which the procedure is applied to polyvinyl formate illustrates the maximum hydroxyl content achieved by hydrolysis and serves as a basis for comparison with the hydrolysis products of the vinyl formate-vinyl stearate copolymers. Although the sodium salt of an alkyl aryl polyether sulfate, as disclosed in Example 15, is a preferred emulsifying agent, the particular emulsifier used is not considered a critical factor in the operation of the process.

EXAMPLE 15

Fifteen grams of polyvinyl formate were dissolved in 90 ml. of ethylene dichloride or toluene and the solution was well mixed with 150 ml. of a 2.5% aqueous solution of the sodium salt of an alkyl aryl polyether sulfate until an emulsion had formed. The reaction mixture was heated for about 5 hours at 70–80° C. with good agitation. The emulsion was broken by pouring the reaction mixture into concentrated salt solution. The bulk of the liquid was removed by suction filtration, and the contents of the funnel was poured into a large excess of methanol to precipitate the polymer. The polymer was filtered, washed with methanol and dried to constant weight. Analysis showed a hydroxyl content of 35%.

Vinyl formate-vinyl stearate copolymers containing 4 to 15% by weight of vinyl stearate were hydrolyzed by the procedure described in Example 15. The values for hydroxyl content as determined for each product are presented in Table III as Examples 16 through 19.

When the hydrolysis procedure of Example 15 was applied to copolymers containing more than 15% by weight of vinyl stearate the filtration step was omitted. This change in procedure was for convenience only, and was an arbitrary decision. After the emulsion was broken the organic solvent layer was poured into excess methanol to precipitate the copolymer. The copolymer was recovered, washed with methanol, and dried to constant weight. The hydroxyl contents of these products are entered in Table III as Examples 20 through 24.

TABLE III

*Hydroxyl and melting range determinations after hydrolysis and hydroxyl determinations after alcoholysis of polyvinyl formate and poly (vinyl formate-co-stearate)*

| Vinyl Stearate, Percent by weight | Hydrolysis | | | Alcoholysis | |
|---|---|---|---|---|---|
| | Example No. | Hydroxyl Content, Percent | Melting Range, °C. | Example No. | Hydroxyl Content, Percent |
| 0 | 15 | 35.0 | 132–215 | 25 | 34.4 |
| 4 | 16 | 33.4 | 109–150 | 26 | 33.6 |
| 8 | 17 | 32.5 | 104–175 | 27 | 33.1 |
| 12 | 18 | 30.3 | 104–170 | 28 | 32.3 |
| 15 | 19 | 28.3 | 104–170 | 29 | 30.5 |
| 19 | 20 | 26.9 | 100–165 | | |
| 33 | 21 | 25.0 | 89–104 | 30 | 23.2 |
| 59 | 22 | 10.2 | 54–60 | 31 | 11.7 |
| 81 | 23 | 1.8 | 44–47 | 32 | 4.9 |
| 93 | 24 | 0.9 | 45–46 | 33 | 1.8 |

Removal of formate groups from the vinyl compositions of Table III by alcoholysis is illustrated in the following examples.

EXAMPLE 25

Ten grams of polyvinyl formate were dissolved in 150 ml. of ethylene chloride, followed by solution of 1 g. of naphthalene-2-sulfonic acid. Seventy milliliters of methanol were added in small portions with good agitation and the reaction mixture was refluxed for five hours. The alcoholized polymer was then precipitated by pouring the reaction mixture into several volumes of cold methanol. The polyvinyl alcohol was filtered, washed with methanol and dried to constant weight. The hydroxyl content determination of 34.4% is entered in Table III as Example 25.

Vinyl formate-vinyl stearate copolymers containing 2 to 15% by weight of vinyl stearate were selectively alcoholized by the procedure described in Example 25. The hydroxyl determinations for these products are presented in Table III, Examples 26 through 29.

The procedure for Examples 30 through 33 was the same as that of Example 25 with the exception that toluene was used instead of ethylene dichloride.

The low percent of hydroxyl groups determined for Examples 23, 24, 32 and 33 demonstrates the stability of the stearate groups while formate groups are being removed by either hydrolysis or alcoholysis, as conducted by the disclosed procedures.

In yet another hydrolytic procedure, the copolymer of vinyl formate and vinyl stearate was dissolved in an organic solvent (such as dioxane) containing water in excess of that required to hydrolyze all of the formate groups, but less than that which would cause the copolymer of vinyl formate and vinyl stearate to precipitate. An acid catalyst (such as naphthalene-2-sulfonic acid) was used, although any non-oxidizing acid, as HCl, is also satisfactory as an acid catalyst for this process and also for the alcoholysis process described in Example 25.

All the vinyl alcohol-vinyl stearate copolymers listed in Table III as Examples 15–24 were soluble in phenol but none was soluble in acetone, methanol, 50% aqueous methanol, dioxane or ethylene dichloride. Numbers 15–17 were insoluble in benzene or toluene while numbers 22–24 were soluble in both. Number 15 quickly and completely dissolved in hot water; number 16 (26) slowly dissolved, while numbers 17–19 were soluble only to the extent of 0.9, 0.7 and 0.4% respectively; all the others showed negligible solubility.

Since water absorption is an important property of plastic materials, it was determined on several polyvinyl alcohol copolymers similar to those described in Table II. Results are shown in Table IV.

TABLE IV

*Water absorption of polyvinyl alcohol copolymers*

| Vinyl Stearate in Copolymer, Percent | Water Absorbed, Percent of polymer |
|---|---|
| 0 | 254 |
| 3.7 | 37.6 |
| 7.8 | 13.2 |
| 36.6 | 0.0 |

These data were obtained by immersing the sample in water at 25° C. for 20 hr., drying them superficially, and weighing them.

From the data of Tables III and IV it is apparent that the polyvinyl alcohol copolymers containing up to about 30% of stearate retain to a great extent the high melting point of polyvinyl alcohol while at the same time a high degree of water resistance is imparted by even a few percent of stearate.

Replacement of the vinyl stearate used in the examples described above with vinyl esters of other saturated fatty acids containing 12 to 18 carbon atoms yields products having properties very similar to those shown in the examples, the principal difference being that when the shorter chain fatty acids are used, a somewhat higher percentage of their vinyl esters must be used in the copolymers to achieve equivalent results.

It is frequently advantageous, especially for economic reasons, to use a mixture of vinyl esters of two or more higher fatty acids rather than a single ester. Since mixtures of higher fatty acids such as myristic, palmitic, stearic and acids from tallow or lauric and myristic acids from coconut oil, are more readily available than are the single pure acids, and since such mixtures are suitable for the preparation of vinyl esters to be used in this invention, it is to be understood that the invention includes the use of such mixed vinyl esters.

We claim:

1. A process comprising heating a copolymer of vinyl formate and a vinyl ester of a saturated fatty acid having 12 through 18 carbon atoms in its molecule with a reagent selected from the group consisting of dilute aqueous acid, water in the presence of an emulsifying agent, and alcohol in the presence of an acid catalyst to remove essentially all of the formate groups from the treated copolymer without affecting significantly the ester groups of the fatty acid, thus to produce a copolymer of vinyl alcohol and said vinyl ester having improved water resistance.

2. A process comprising heating a suspension of a copolymer of vinyl formate and a vinyl ester of a saturated fatty acid having 12 through 18 carbon atoms in its molecule in dilute aqueous acid to remove essentially all of the formate groups from the treated copolymer without affecting significantly the ester groups of the fatty acid, thus to produce a copolymer of vinyl alcohol and said vinyl ester having improved water resistance.

3. A process comprising heating an aqueous emulsion of a copolymer of vinyl formate and a vinyl ester of a saturated fatty acid having 12 through 18 carbon atoms in its molecule to remove essentially all of the formate groups from the treated copolymer without affecting significantly the ester groups of the fatty acid, thus to produce a copolymer of vinyl alcohol and said vinyl ester having improved water resistance.

4. A process comprising heating a copolymer of vinyl formate and a vinyl ester of a saturated fatty acid having 12 through 18 carbon atoms in its molecule with an alcohol in the presence of an acid catalyst to remove essentially all of the formate groups from the treated copolymer without affecting significantly the ester groups of the fatty acid, thus to produce a copolymer of vinyl alcohol and said vinyl ester having improved water resistance.

5. A process comprising heating a suspension of a copolymer of vinyl formate and a vinyl ester of a saturated fatty acid have 12 through 18 carbon atoms in its molecule in about 0.01 to 0.2 N aqueous acid at about 60° to 100° C. to remove essentially all of the formate groups from the treated copolymer without affecting significantly the ester groups of the fatty acid, thus to produce a copolymer of vinyl alcohol and said vinyl ester having improved water resistance.

6. A process comprising heating an aqueous emulsion of a copolymer of vinyl formate and a vinyl ester of a saturated fatty acid having 12 through 18 carbon atoms in its molecule at about 70° to 100° C. to remove essentially all of the formate groups from the treated copolymer without affecting significantly the ester groups of the fatty acid, thus to produce a copolymer of vinyl alcohol and said vinyl ester having improved water resistance.

7. A process comprising refluxing in the presence of an acid catalyst, an alcoholic solution of a copolymer of vinyl formate and a vinyl ester of a saturated fatty acid having 12 through 18 carbon atoms in its molecule to remove essentially all of the formate groups from the treated copolymer without affecting significantly the ester groups of the fatty acid, thus to produce a copolymer of vinyl alcohol and said vinyl ester having improved water resistance.

References Cited in the file of this patent

UNITED STATES PATENTS

| | | |
|---|---|---|
| 2,333,804 | Malm et al. | Nov. 9, 1943 |
| 2,360,308 | Thomas et al. | Oct. 10, 1944 |
| 2,657,201 | Nebel | Oct. 27, 1953 |
| 2,668,809 | Bryant et al. | Feb. 9, 1954 |